US010966574B2

(12) United States Patent
Chen (10) Patent No.: US 10,966,574 B2
(45) Date of Patent: Apr. 6, 2021

(54) MULTI-FUNCTION DRAINING BASKET FOR KITCHEN SINK (71) Applicant: Yu-Shu Chen, Taipei (TW)

(72) Inventor: Yu-Shu Chen, Taipei (TW)

(*) Notice: Subject to any disclaimer, the term of this patent is extended or adjusted under 35 U.S.C. 154(b) by 71 days.

(21) Appl. No.: 16/526,581

(22) Filed: Jul. 30, 2019

(65) Prior Publication Data
US 2021/0030212 A1 Feb. 4, 2021

(51) Int. Cl.
A47J 47/20 (2019.01)
A47L 19/04 (2006.01)
A47J 43/24 (2006.01)
B65F 1/14 (2006.01)

(52) U.S. Cl.
CPC ............. A47J 47/20 (2013.01); A47J 43/24 (2013.01); A47L 19/04 (2013.01); B65F 1/1415 (2013.01); B65F 2210/18 (2013.01)

(58) Field of Classification Search
CPC ...................................... A47J 47/20
USPC ....... 4/290; 426/231, 244; 99/330, 358, 416, 99/426, 449, 410, 413, 414; 248/18–318, 248/320, 323–324; 210/232, 249; 29/401.1
See application file for complete search history.

(56) References Cited

U.S. PATENT DOCUMENTS

| | | | | |
|---|---|---|---|---|
| 3,648,595 A * | 3/1972 | Morris | ............... | A47J 37/1223 99/342 |
| 5,088,618 A * | 2/1992 | Colombo | ............... | A47L 13/51 206/216 |
| 5,921,172 A * | 7/1999 | Kiczko | ............... | A47J 37/1295 99/416 |
| 8,025,172 B1 * | 9/2011 | Zink | ............... | E04H 4/14 220/485 |
| 8,037,812 B1 * | 10/2011 | Sumner, Sr. | ........ | A47J 37/1295 99/407 |
| 8,904,924 B1 * | 12/2014 | Piazza | ............... | A47J 37/1242 99/407 |
| 10,039,420 B2 * | 8/2018 | Housley | ............... | A47J 43/24 |
| 2005/0072309 A1 * | 4/2005 | Mullaney, Jr. | ...... | A47J 37/1223 99/330 |
| 2005/0077299 A1 * | 4/2005 | Cheng | ............... | B65D 7/14 220/485 |
| 2006/0060522 A1 * | 3/2006 | Bushey | ............... | A47J 47/20 210/470 |
| 2008/0210260 A1 * | 9/2008 | Porter | ............... | B08B 3/02 134/18 |
| 2008/0210280 A1 * | 9/2008 | Publ | ............... | B08B 3/02 134/57 R |
| 2009/0252842 A1 * | 10/2009 | Wang | ............... | A47J 37/1271 426/231 |
| 2011/0232665 A1 * | 9/2011 | Barnett, Jr. | ............... | A45B 9/04 132/200 |
| 2012/0018439 A1 * | 1/2012 | Distefano | ............. | D06F 53/005 220/666 |
| 2013/0192647 A1 * | 8/2013 | Ledel | ............... | B08B 3/047 134/22.1 |

(Continued)

Primary Examiner — Lori L Baker
(74) Attorney, Agent, or Firm — Wang Law Firm, Inc.

(57) ABSTRACT

A multi-function draining basket for kitchen sink: includes a basket body, having a pair of supporting rods oppositely extended from the basket body adapted to be rested on two opposite edge portions of a kitchen sink, and at least a clamping panel pivotally secured on the basket body for clamping or holding a kitchen-waste bag on the clamping panel.

10 Claims, 10 Drawing Sheets (56) References Cited

U.S. PATENT DOCUMENTS

| | | | |
|---|---|---|---|
| 2014/0060340 A1* | 3/2014 | Matos | A47J 37/1295 99/416 |
| 2014/0346102 A1* | 11/2014 | Housley | A47J 43/24 210/232 |
| 2016/0331129 A1* | 11/2016 | VanHeusden | A47B 96/022 |
| 2016/0375469 A1* | 12/2016 | Tafoya | B08B 3/10 134/18 |

* cited by examiner

MULTI-FUNCTION DRAINING BASKET FOR KITCHEN SINK

BACKGROUND OF THE INVENTION

When washing utensils, bowls, or eating tools in a kitchen sink, it is quite embarrassing to treat the kitchen waste. A plastic bag or trash container may be provided for storing the kitchen waste in the bag or container. Still, the bag or container, if not equipped with a cover or lid thereon, may spread waste order outwardly or may attract cockroaches, flies, or ants into the kitchen waste, causing a hygienic problem.

It is therefore expected to disclose a draining basket, which may be hung or held on the kitchen sink for washing purpose and may be folded when not in use. Also, the draining basket is preferably attached with a kitchen-waste bag on the basket for storing the kitchen waste therein for hygienic purpose.

SUMMARY OF THE INVENTION

The object of the present invention is to provide a multi-function draining basket, which may be unfoldably hung or held on a kitchen sink for washing purpose, and also provide a clamping panel pivotally secured to the basket for fastening a kitchen-waste bag on the basket for storing the kitchen waste in the bag for hygienic purpose. The draining basket comprises: a basket body hung or formed on a pair of supporting members to be held on a kitchen sink or foldably held on a kitchen sink or operatively unfolded to be an extended basket body for washing in the basket body within the kitchen sink. The supporting members may be made as telescopic to be extendibly or retractably held on the sink.

According to the present invention, the basket body includes: a first panel; a second panel opposite to said first panel; a third panel pivotally connected between said first panel and said second panel at each first end of said first panel and of said second panel; a fourth panel pivotally connected between said first panel and said second panel at each second end of said first panel and of said second panel, and positioned opposite to said third panel; and a bottom panel pivotally connected between said first panel and said second panel at each bottom end portion of said first panel and of said second panel; said third panel and said fourth panel each formed with a vertical folding portion or folding line at a central portion of said third panel or a central portion of said fourth panel; said bottom panel having a horizontal holding portion or folding line formed at a central portion of said bottom panel, whereby upon folding of all said panels, said third and fourth panels will be inwardly folded to retract or close said first panel towards said second panel, and said bottom panel will be downwardly folded as foldably pendent below said first and second panels.

According to the present invention, all said panels are integrally formed to be foldably retracted or unfoldably extended; and a pair of folding portions are each formed between said first panel and said third panel, and between said third panel and said second panel; and another pair of folding portions are each formed between said first panel and said fourth panel, and between said fourth panel and said second panel; and a pair of bottom folding portions are each formed between said bottom panel and said first panel, and between said bottom panel and said second panel.

According to the present invention, said third panel has a pair of pivots respectively formed on opposite end portions of said third panel to be respectively pivotally connected with said first panel and said second panel; and said fourth panel has another pair of pivots respectively formed on opposite end portions of said fourth panel to be respectively connected with said first panel and said second panel; and said bottom panel has a pair of bottom-panel pivots respectively formed on opposite end portions of said bottom panel to be respectively connected with each bottom end portion of said first panel and said second panel.

According to the present invention, said clamping panel for fastening said kitchen-waste bag is integrally formed with said basket body, having a folding portion formed between said clamping panel and said basket body for pivoting said clamping panel about said basket body.

According to the present invention, said clamping panel includes a pivot for pivotally connecting said clamping panel to said basket body.

According to the present invention, said basket body is formed with an opening to insert said kitchen-waste bag through said opening in order to be hung or wound on said basket body, whereby upon pivotal closing of said clamping panel to close said opening, said kitchen-waste bag will be sealed and fastened on said basket body by engaging a locking portion of said clamping panel on said basket body.

According to the present invention, said bottom panel includes at least a concave portion formed on an end portion of the bottom panel, and each said third panel or said fourth panel formed with at least a convex portion formed on a bottom end portion of each said third panel or said fourth panel, whereby upon extending of said basket body, said third panel and said fourth panel will be unfolded to engage each said convex portion of said third or fourth panel with each said concave portion of said bottom panel as unfolded to thereby stably extend all said panels for unfolding or opening said basket body.

According to the present invention, said draining basket further comprises a water jacket circumferentially encasing said basket body when unfolded or opened and operatively hung or held on said basket body for filling or storing water in said water jacket for washing utensils or foods; said water jacket having a plurality of hook portions for fastening said water jacket on said basket body.

According to the present invention, said first panel is operatively folded to approach said second panel to a sink corner by cooperatively folding said third and fourth panels between said first and second panels, and cooperatively folding said bottom panel downwardly to be folded pendently below said first panel and said second panel as folded, to thereby form a folded basket body, not occupying a big space in the sink. The clamping panel is provided to fasten a kitchen-waste bag on the basket body for storing kitchen waste in the bag for hygienic purpose.

The present invention may be further described in the following description with reference to the drawings accompanied herewith.

DETAILED DESCRIPTION

Figure 1:
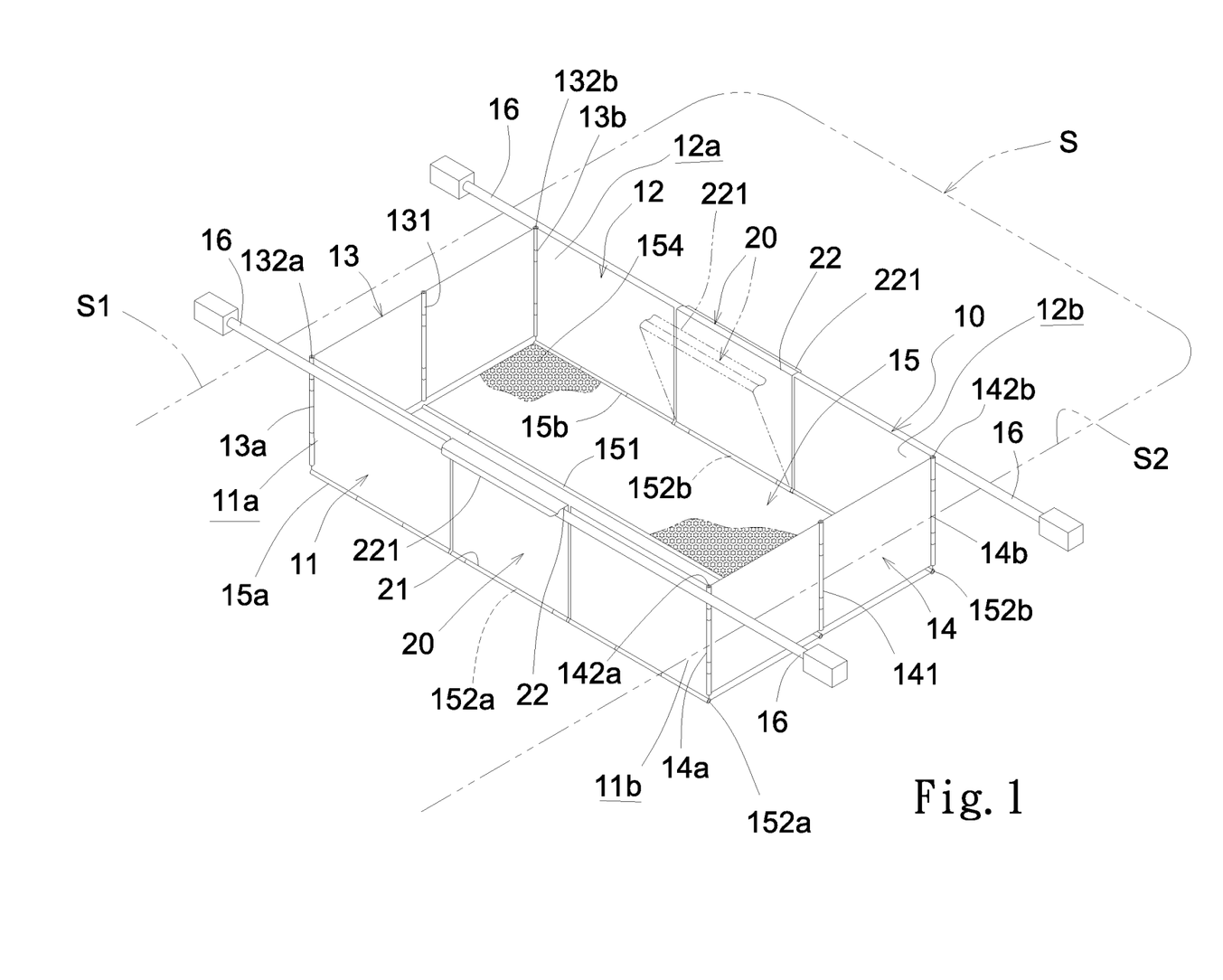
FIG. 1 is an illustration showing a perspective structure of the present invention.
Figure 2:
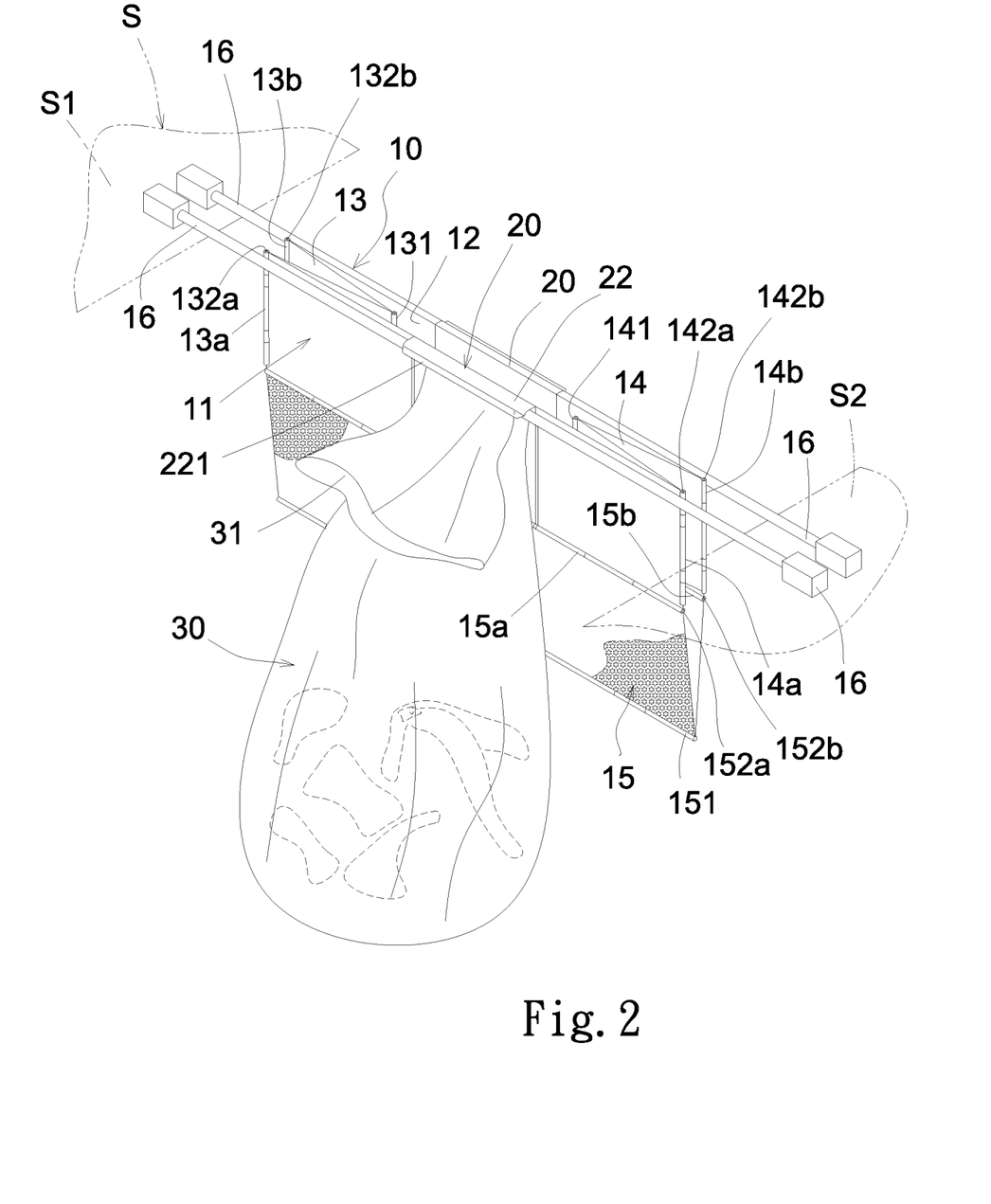
FIG. 2 shows a folded basket body having a kitchen-waste bag fastened thereon.
Figure 3:
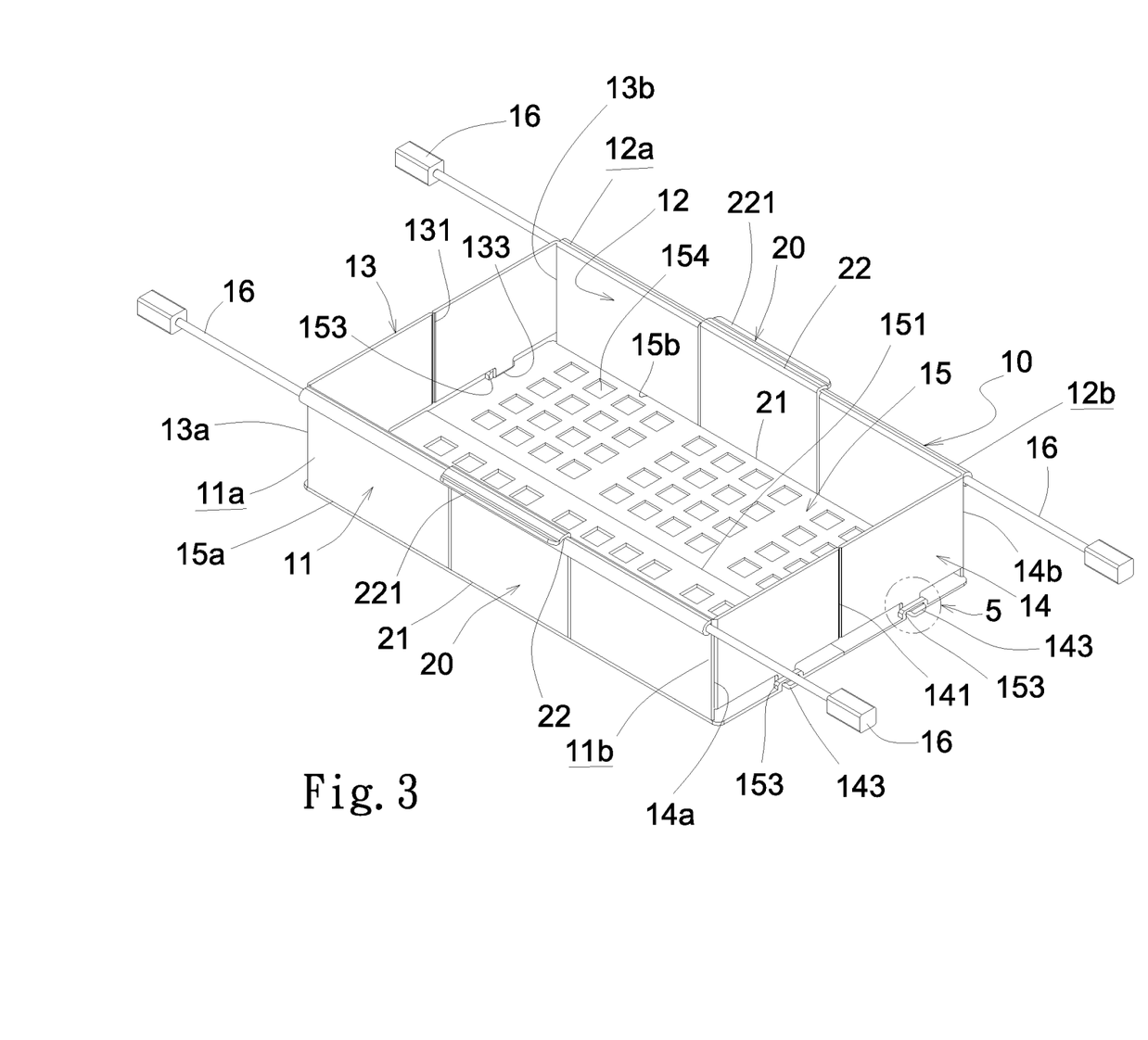
FIG. 3 shows a second preferred embodiment of the present invention.

As shown in FIGS. 1, 2 and 3, a multi-function draining basket for kitchen sink of the present invention comprises: a basket body 10, having a pair of supporting rods 16 sidewardly extended from the basket body 10 adapted to be rested on two opposite edge portions S1, S2 of a kitchen sink S; and at least a clamping panel 20 pivotally secured on the basket body 10 for clamping or holding a kitchen-waste bag 30 on the clamping panel 20. The clamping panel 20 includes a pivotal bottom portion 21 pivotally secured to the basket body 10, and a locking portion 22 formed on an upper portion of the clamping panel 20 opposite to the pivotal bottom portion 21 and having a locking clip 221 for clamping a bag opening 31 of the kitchen-waste bag 30 for fastening the bag 30 on the basket body 10.

The basket body 10 includes: a first panel 11; a second panel 12 opposite to the first panel 11; a third panel 13 respectively pivotally connected to the first panel 11 and the second panel 12 at a first end 11a of the first panel 11 and a first end 12a of the second panel 12; a fourth panel 14 respectively pivotally connected to the first panel 11 and the second panel 12 at a second end 11b of the first panel 11 and a second end 12b of the second panel 12; and a bottom panel 15 pivotally connected to the first panel 11 and the second panel 12 to be foldably linked between the first panel 11 and the second panel 12 to form a rectangular (or square) basket when extended as shown in FIG. 1. Each panel 13, 14, 15 is formed with a folding portion (or a hinge) 131, 141, 151 at each central portion of each panel 13, 14, 15. Essentially, the third panel 13 is formed with a vertical folding portion 131 at a central portion of the third panel 13. The fourth panel 14 is formed with a vertical folding portion 141 at a central portion of the fourth panel 14. While the bottom panel 15 is formed with a horizontal folding portion 151 at a central portion 151 at a central portion of the bottom panel 15. Upon folding of the basket body 10, the third panel 13 and the fourth panel 14 will be inwardly folded respectively along the vertical folding portions 131, 141 and the bottom panel 15 will be downwardly folded along the horizontal folding portion 151 to form a folded basket as shown in FIG. 2.

As shown in FIG. 1, the third panel 13 has its opposite end portions respectively pivotally connected with the first panel 11 by a pivot 132a and pivotally connected with the second panel 12 with a pivot 132b. The fourth panel 14 has its opposite end portions respectively pivotally connected with the first panel 11 by a pivot 142a and pivotally connected with the second panel 12 by a pivot 142b, The bottom panel 15 has its two opposite end portioned respectively pivotally connected with a bottom end portion of the first panel 11 by a pivot 152a, and pivotally connected with a bottom end portion of the second panel 12 by a pivot 152b. So, the third panel 13 may be inwardly folded along or about the vertical folding portion (or hinge) 131, having two opposite end portions of the third panel 13 rotated about the two pivots 132a, 132b respectively pivotally connected with the first panel 11 and the second panel 12. The fourth panel 14 may be inwardly folded along or about the vertical folding portion (or hinge) 141, having two opposite end portions of the fourth panel 14 pivotally rotated about the two pivots 142a, 142b respectively pivotally connected with the first panel 11 and the second panel 12. The bottom panel 15 may be downwardly folded along the horizontal folding portion (or hinge) 151, having two opposite end portions of the bottom panel 15 pivotally rotated about the two pivots 152a, 152b respectively connected to each bottom end portion of the first panel 11 and the second panel 12 as shown in FIG. 2.

As shown in FIG. 3, the first panel 11, the second panel 12, the third panel 13, the fourth panel 14 and the bottom panel 15 may be integrally formed, such as made by plastic molding process, to be the basket body 10 of the present invention. A folding portion (or folding line) 13a is vertically formed between the first panel 11 and the third panel 13. Another folding portion (or folding line) 13b is vertically formed between the second panel 12 and the third panel 13. At a central portion of the third panel 131 a folding portion (or folding line) 131 is vertically formed thereon for inwardly folding the third panel 13 about the folding portion 131. Still another folding portion (or folding line) 14a is vertically formed between the first panel 11 and the fourth panel 14. Further folding portion (or folding line) 14b is vertically formed between the second panel 12 and the fourth panel 14. A folding portion (or line) 141 is vertically formed at a central portion of the fourth panel so that the fourth panel 14 may be inwardly folded about the folding portion 141. The bottom panel 15 has its opposite end portions respectively formed with a pair of folding portion (or folding line) 15a, 15b respectively foldably connected with the first panel 11 and with the second panel 12 so that the bottom panel 15 may be downwardly folded about a horizontal folding portion (or line) 151 formed at a central portion of the bottom panel 15.

However, the foldable connection methods or mechanism among the third panel 13, first panel 11, the second panel 12, the fourth panel 14, and the bottom panel 15 are not limited in the present invention.

Figure 4:
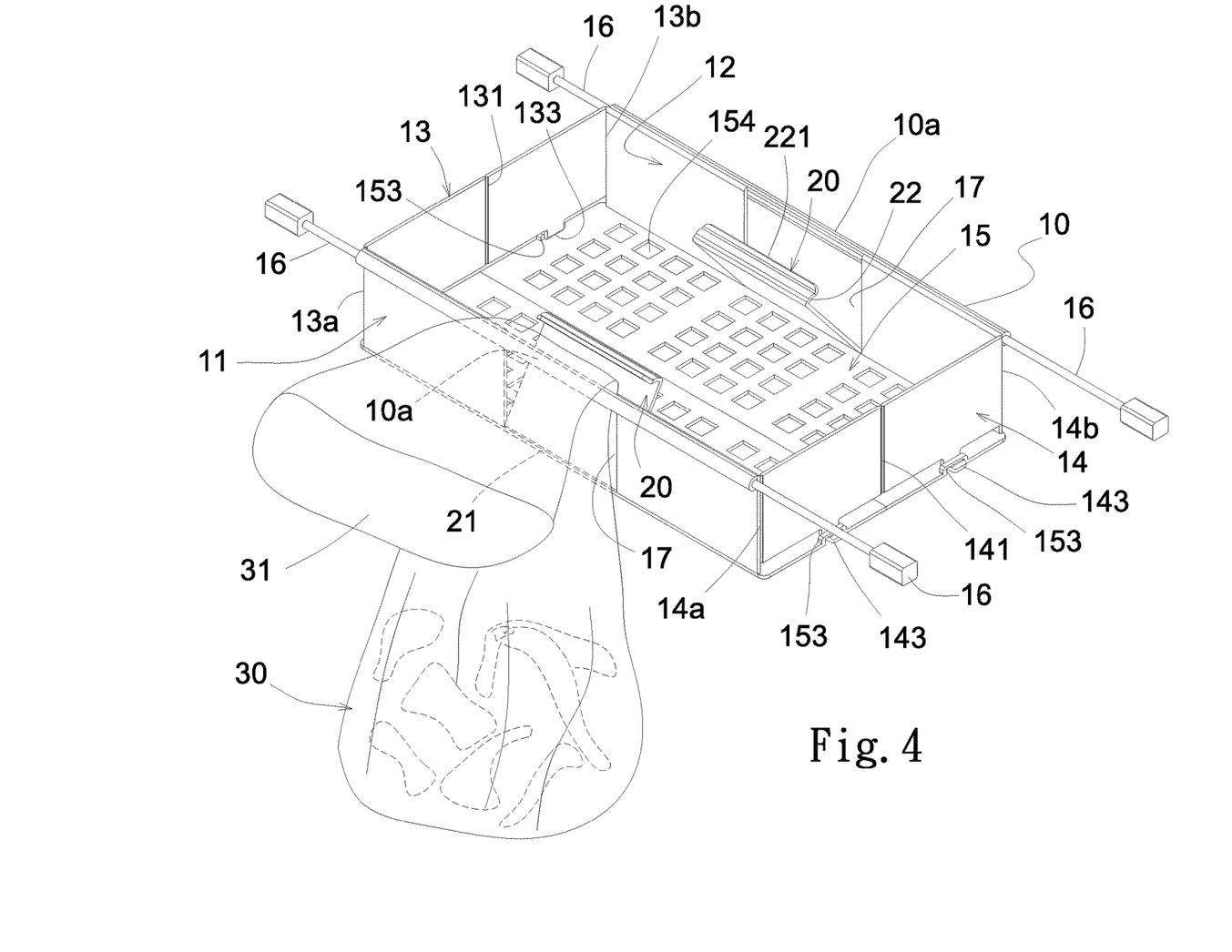
FIG. 4 is an illustration showing a kitchen-waste bag being fastened on the basket body.

As shown in FIG. 3, the clamping panel 20 may be integrally formed with the basket body 10 having the bottom pivotal portion 21 formed as a folding portion or folding line between the clamping panel 20 and the basket body 10, so that the clamping panel 20 may be unfolded or "opened" from the basket body 10 as shown in FIG. 4.

As shown in FIG. 1, the bottom pivotal portion 21 of the clamping panel 20 is pivotally connected with the basket body 10 by a pivot 152a or 152b so that the clamping panel 20 may be pivotally unfolded from the basket body 10. In FIG. 2, there are two clamping panels 20 respectively formed on opposite sides of the basket body 10.

Of course, the pivotal mechanism or configuration of the bottom pivotal portion 21 between the clamping panel 20 and basket body 10 is not limited in this invention.

As shown in FIG. 4, an opening 17 is formed between the bottom pivotal portion 21 and an upper pipe (or tube) 10a formed on an upper portion of the first panel 11 or second panel 12, whereby upon engagement of the locking portion 22 of the clamping panel 20 with the upper pipe 10a of the basket body 10, the opening 17 will be closed by the clamping panel 20 for sealing the bag opening 31 of the kitchen-waste bag 30 and fastening the kitchen-waste bag 30 (as hung on the upper pipe 10a) on the basket body 10.

Figure 5:
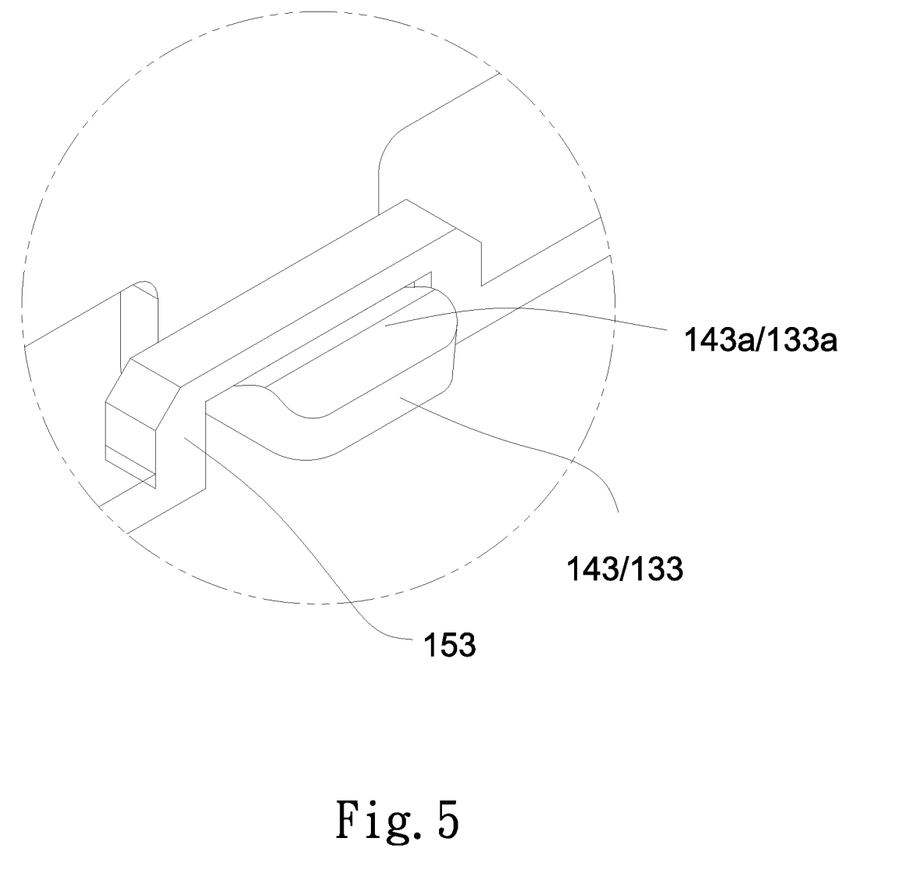
FIG. 5 is an enlarged view for the portion as marked as numeral "5" of FIG. 3.
Figure 6:
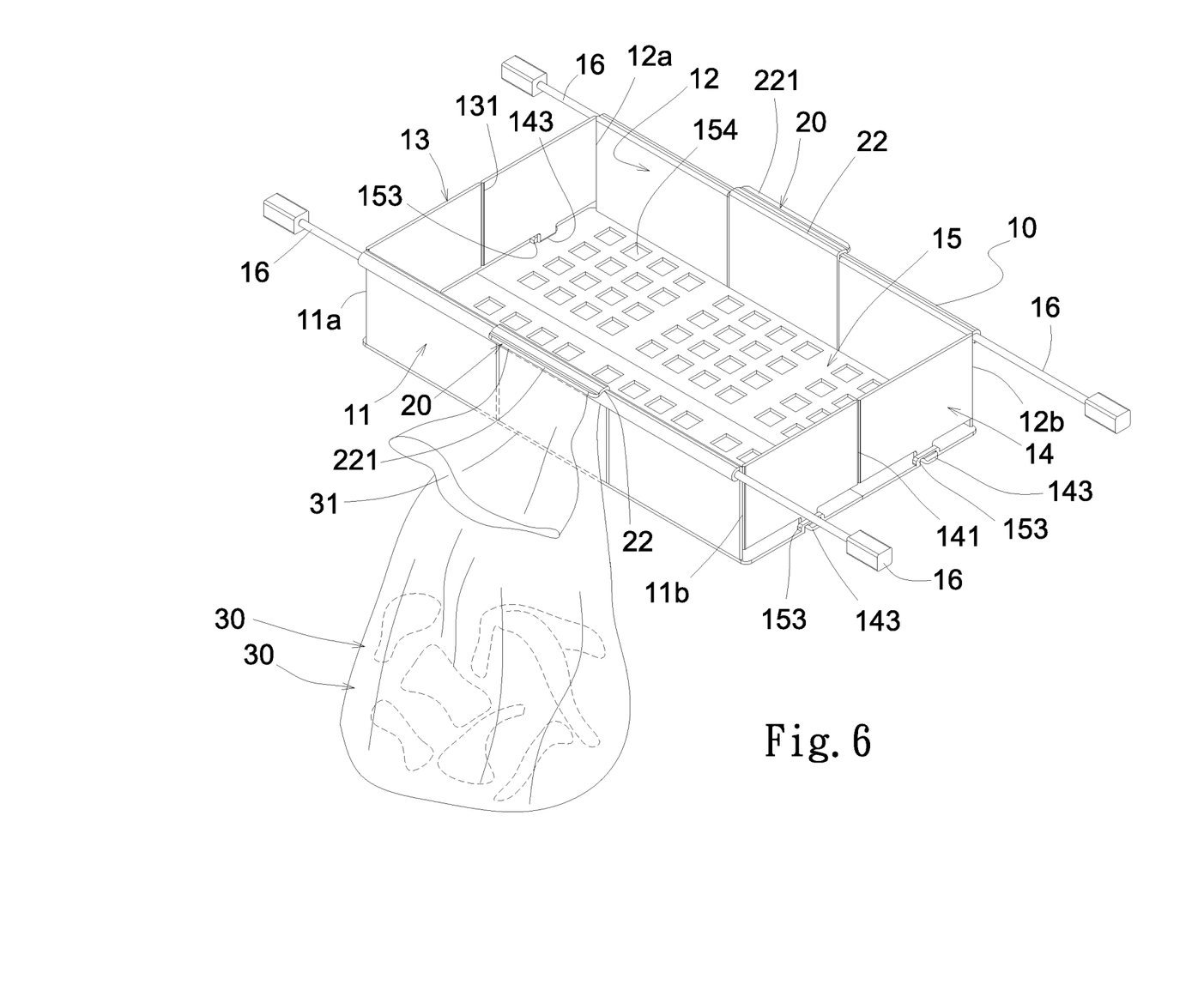
FIG. 6 shows the present invention of FIG. 4, having the kitchen-waste bag firmly fastened thereon.

As shown in FIGS. 3, 4 and 5, the bottom panel 15 has at least one concave portion 153 formed on an end portion of the bottom panel. The third panel 13 has at least one convex portion 133 formed on a bottom end portion of the third panel 13. The fourth panel 14 has at least one convex portion 143 formed on a bottom end portion of the fourth panel. Upon unfolding of the plural panels 11, 12, 13, 14 and 15 for forming the rectangular-shaped basket body 10 of the present invention, each convex portion 133 or 143 of the third panel 13 or fourth panel 14 will be engaged with each concave portion 153 of the bottom panel 15 so that the third and fourth panels 13, 14 will be stably engaged and held with the bottom panel 15 for unfolding the basket body 10. Each convex portion 133 or 143 is formed with a protrusion 133*a* or 143*a* especially as shown in FIG. 5 protruded and curved upwardly in order to help a smooth engagement of each convex portion 133 or 143 of the third panel 13 or fourth panel 14 with the concave portion 153 of the bottom panel 15.

The plural panels 11~15, especially the bottom panel 15, are formed with a plurality of drain holes 154 in order to drain water through the panels of the basket body 10. Or, the panels 11~15 may be formed as net or mesh for draining water through the basket body, not limited in this invention.

The supporting rod 16 may be formed as a rod, a pipe, a tube or a bracket or a telescopic member, adapted to be held or hung on the edge portion of the kitchen sink, not limited in this invention.

Figure 7:
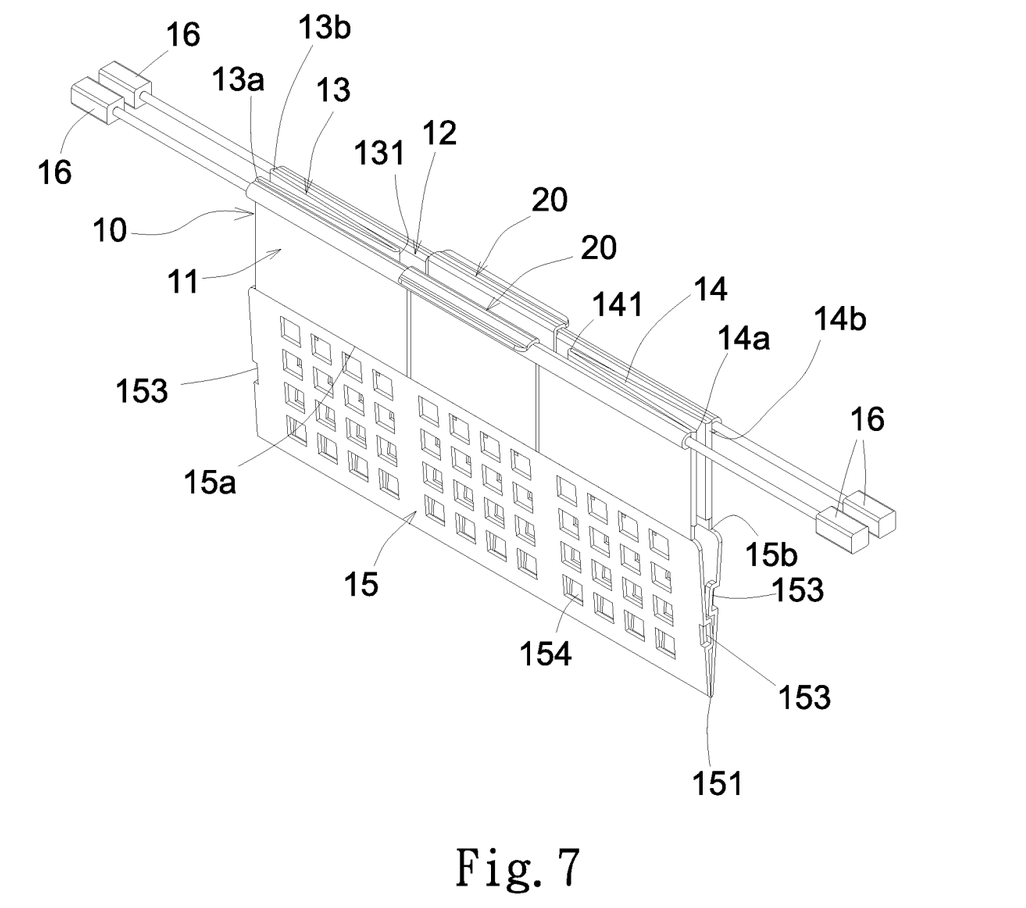
FIG. 7 shows a folded structure of the present invention as shown in FIG. 3.
Figure 8:
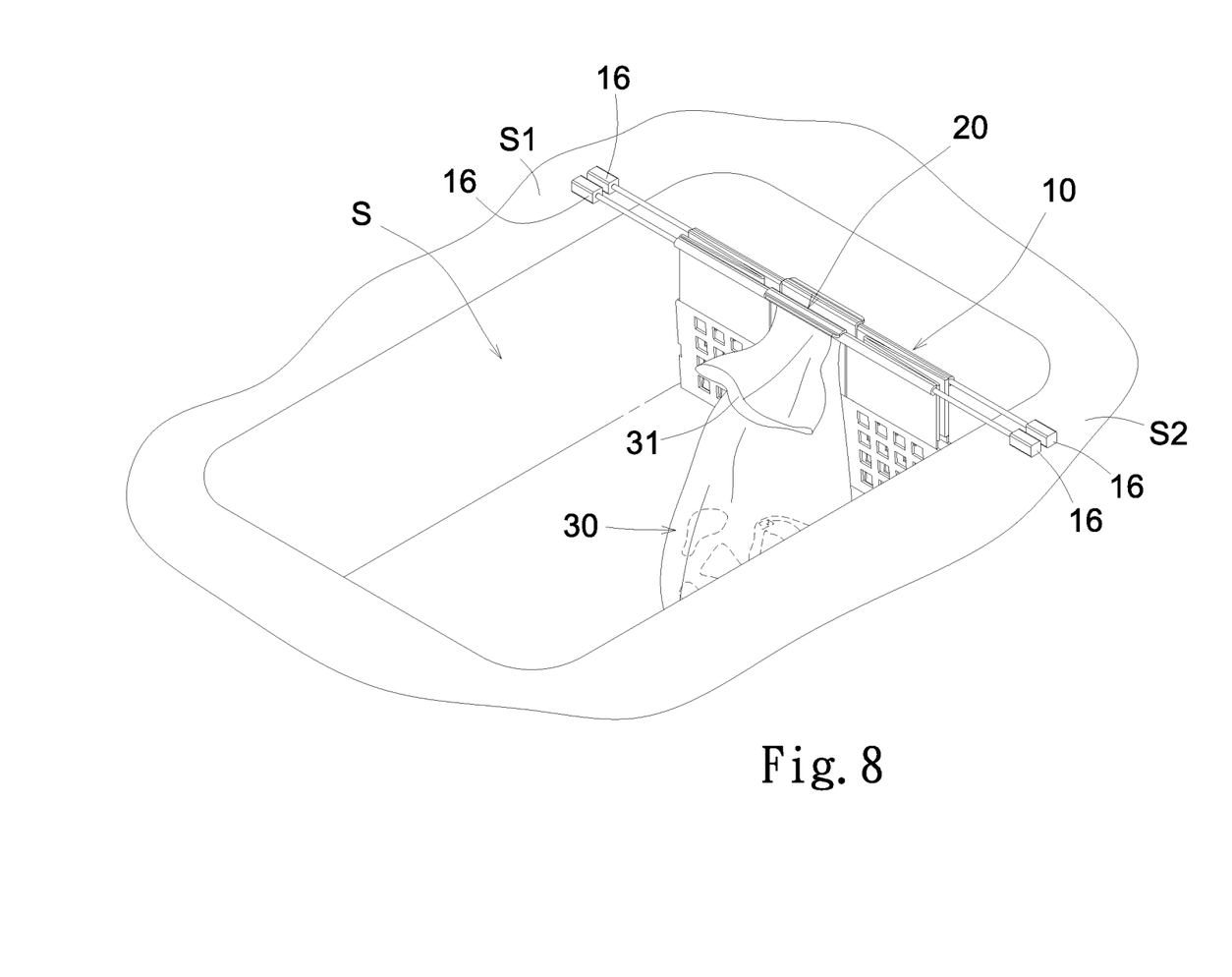
FIG. 8 shows the folded basket fastened with the kitchen-waste bag as held on the kitchen-sink.

As shown in FIGS. 2, 7, and 8, when folding the plural panels 11~15 of the present invention, the first panel 11 is folded to approach the second panel 12; the third panel 13 and the fourth panel 14 will be cooperatively inwardly folded between the first panel 11 and the second panel 12; while the bottom panel 15 will be downwardly or pendently folded, to thereby fold the plural panels 11~15 to be a collapsed state with reduced volume after being folded. So, the basket body 10 may then be folded and pushed to a side portion of the kitch sink S to reduce its occupying volume or space in the sink.

Figure 9:
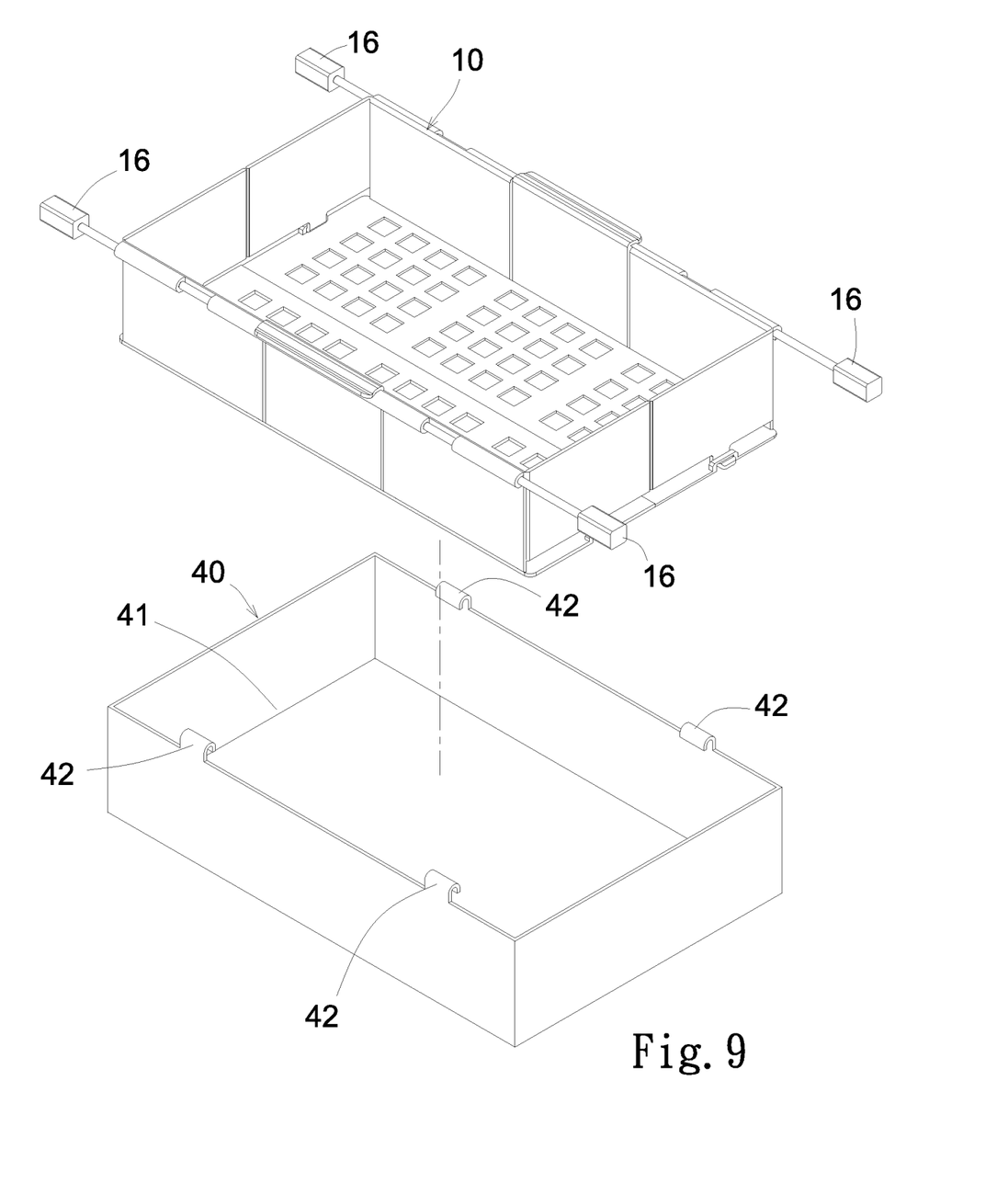
FIG. 9 is an illustration showing a water jacket as separated from the basket body.
Figure 10:
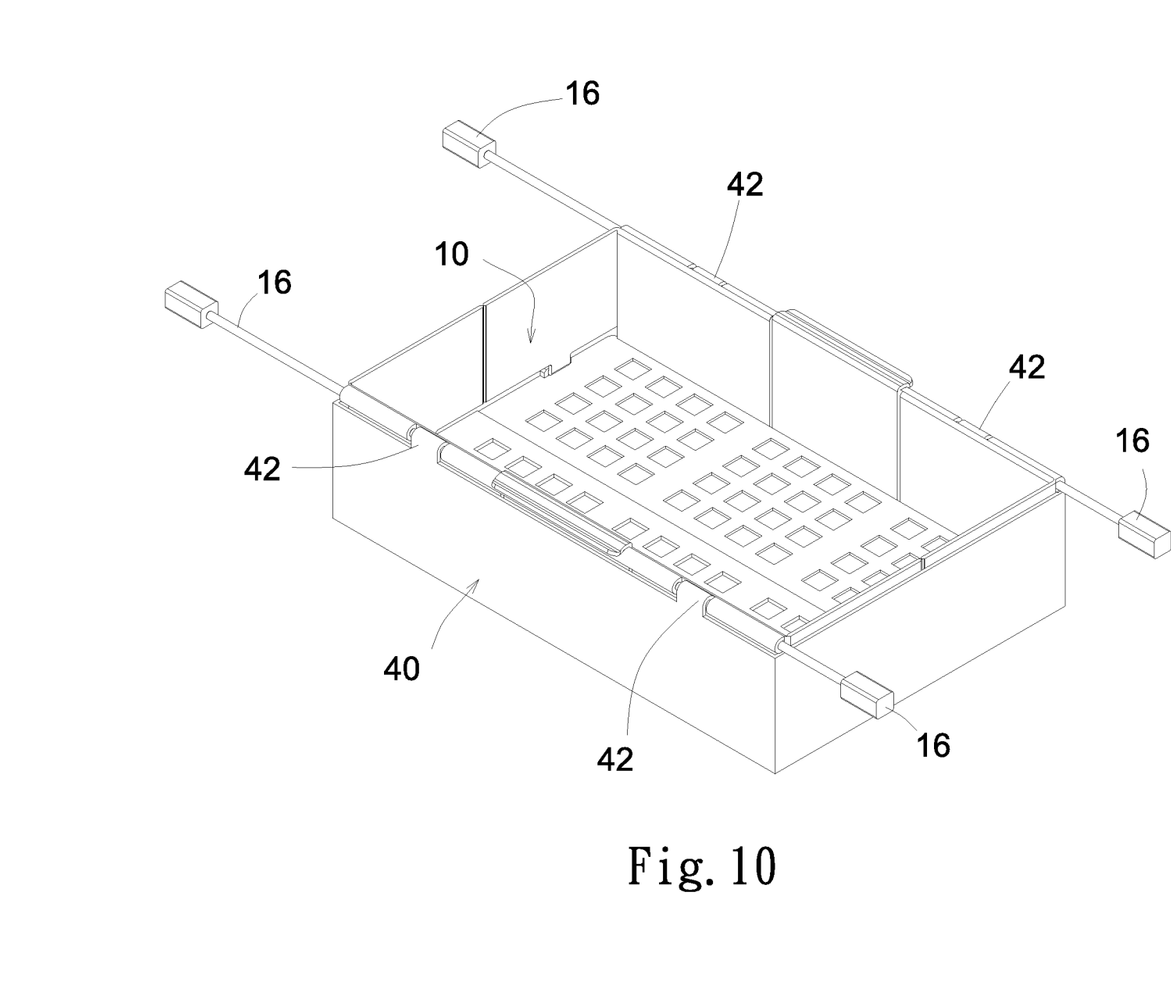
FIG. 10 is an illustration showing the basket body having the water jacket encased thereon.

As shown in FIGS. 9 & 10, the present invention further comprises a water jacket (or container) 40 having a basin 41 formed in the water jacket 40, and a plurality of hook members 42 circumferentially formed on an upper portion of the water jacket 40 to be engaged on an upper portion of the basket body 10, such as on an upper portion of each first panel 11 and each second panel 12 so that the water jacket 40 may be hung or held on the basket body 10 for filling and storing water into the basin 41 for washing utensils, foods, fruits, and vegetables within the basin 41. The water jacket 40 should have a volume or dimension enough to circumferentially encase the basket body 10 in the water jacket 40 so as to fill or store water into the basin 41 of the jacket 40. The water jacket 40 may be made of silicon, plastic or metal, not limited in this invention.

The present invention provides a draining basket which can be foldably hung on a kitchen sink when not in use, and can be quickly unfolded to extend the plural panels 11~15 to form a rectangular-shaped basket for washing utensils, foods, fruits, and vegetables. When needed, the water jacket 40 may be hung on the basket body 10 for storing water in the jacket 40 for washing purpose. A kitchen-waste bag 30 may be fastened on the basket body 10 for storing kitchen waste therein to prevent from intrusion by cockroaches, flies, mosquitos and ants so as to keep a clean kitchen for hygienic purpose. So, the present invention provides a draining basket for multiple functions.

The present invention may be further modified without departing from the spirit and scope of the present invention.

I claim:

1. A multi-function draining basket for kitchen sink, comprising:
a basket body hung or formed on a pair of supporting members which are foldably held on a kitchen sink or operatively unfolded on said kitchen sink for washing in the basket body within the kitchen sink; said basket body including: a first panel; a second panel opposite to said first panel; a third panel pivotally connected between said first panel and said second panel at each first end of said first panel and of said second panel; a fourth panel pivotally connected between said first panel and said second panel at each second end of said first panel and of said second panel, and positioned opposite to said third panel; and a bottom panel pivotally connected between said first panel and said second panel at each bottom end portion of said first panel and of said second panel; said third panel and said fourth panel each formed with a vertical folding portion or folding line at a central portion of said third panel or a central portion of said fourth panel; said bottom panel having a horizontal holding portion or folding line formed at a central portion of said bottom panel, whereby upon folding of all said panels, said third and fourth panels will be inwardly folded to retract or close said first panel towards said second panel, and said bottom panel will be downwardly folded as foldably pendent below said first and second panels; and a clamping panel pivotally secured on said basket body for fastening a kitchen-waste bag on said basket body for storing kitchen waste in the kitchen-waste bag for hygienic purpose.

2. A draining basket according to Claim 1, wherein all said panels are integrally formed and are foldably retracted or unfoldably extended; and a pair of folding portions are each formed between said first panel and said third panel, and between said third panel and said second panel; and another pair of folding portions are each formed between said first panel and said fourth panel, and between said fourth panel and said second panel; and a pair of bottom folding portions are each formed between said bottom panel and said first panel, and between said bottom panel and said second panel.

3. A draining basket according to Claim 1, wherein said third panel has a pair of pivots respectively formed on opposite end portions of said third panel and is respectively pivotally connected with said first panel and said second panel; and said fourth panel has another pair of pivots respectively formed on opposite end portions of said fourth panel and is respectively connected with said first panel and said second panel; and said bottom panel has a pair of bottom-panel pivots respectively formed on opposite end portions of said bottom panel to be and is respectively connected with each bottom end portion of said first panel and said second panel.

4. A draining basket according to claim 1, wherein said clamping panel for fastening said kitchen-waste bag is integrally formed with said basket body, having a folding portion formed between said clamping panel and said basket body for pivoting said clamping panel about said basket body.

5. A draining basket according to claim 1, wherein said clamping panel includes a pivot for pivotally connecting said clamping panel to said basket body.

6. A draining basket according to claim 1, wherein said basket body is formed with an opening through which said kitchen-waste bag is inserted and is hung or wound on said basket body, and whereby upon pivotal closing of said clamping panel and closing of said opening, said kitchen-waste bag is sealed and fastened on said basket body by engaging a locking portion of said clamping panel on said basket body.

7. A draining basket according to Claim 1, wherein said bottom panel includes at least a concave portion formed on an end portion of the bottom panel, and each said third panel or said fourth panel formed with at least a convex portion formed on a bottom end portion of each said third panel or said fourth panel, whereby upon extending of said basket body, said third panel and said fourth panel will be unfolded to engage each said convex portion of said third or fourth panel with each said concave portion of said bottom panel as unfolded to thereby stably extend all said panels for unfolding or opening said basket body.

8. A draining basket according to claim 1, wherein said draining basket further comprises a water jacket circumferentially encasing said basket body when unfolded or opened and operatively hung or held on said basket body for filling or storing water in said water jacket for washing utensils or foods; said water jacket having a plurality of hook portions for fastening said water jacket on said basket body.

9. A draining basket according to claim 8, wherein said water jacket is made of silicon, plastic or metal.

10. A draining basket according to claim 1, wherein said first panel is folded with said second panel by cooperatively folding said third and fourth panels between said first and second panels, and cooperatively folding said bottom panel downwardly to be folded pendently below said first panel and said second panel as folded, to thereby form a folded basket body.

\* \* \* \* \*